(12) United States Patent
Laos et al.

(10) Patent No.: US 10,389,597 B2
(45) Date of Patent: *Aug. 20, 2019

(54) DEVICE ASSET TRACKING AND SERVICE DESK USING A MANAGEMENT SYSTEM AS A DATA SOURCE

(71) Applicant: Quest Software Inc., Aliso Viejo, CA (US)

(72) Inventors: Richard Daniel Laos, Portland, OR (US); Kenneth Galvin, Amissville, VA (US)

(73) Assignee: Quest Software, Aliso Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/709,242

(22) Filed: Sep. 19, 2017

(65) Prior Publication Data

US 2018/0069762 A1    Mar. 8, 2018

Related U.S. Application Data

(63) Continuation of application No. 14/705,878, filed on May 6, 2015, now Pat. No. 9,769,026.

(51) Int. Cl.
*H04L 12/24* (2006.01)
*H04L 12/46* (2006.01)
*H04L 12/66* (2006.01)

(52) U.S. Cl.
CPC .............. *H04L 41/12* (2013.01); *H04L 12/46* (2013.01); *H04L 12/66* (2013.01); *H04L 41/0806* (2013.01); *H04L 41/5074* (2013.01)

(58) Field of Classification Search
CPC ......... H04L 41/12; H04L 12/46; H04L 12/66; H04L 41/0806; H04L 41/5074
USPC ........................................................ 709/224
See application file for complete search history.

(56) References Cited

U.S. PATENT DOCUMENTS

2012/0266073 A1* 10/2012 Tanaka ................ G06F 11/3013
715/736
2014/0222989 A1* 8/2014 Tanaka .................... H04L 41/20
709/224

OTHER PUBLICATIONS

3GPP TR 32.806 V7.0.0 (Jun. 2006) (Year: 2006).*

* cited by examiner

*Primary Examiner* — Chris Parry
*Assistant Examiner* — Weiwei Y Stiltner
(74) *Attorney, Agent, or Firm* — Maschoff Brennan

(57) ABSTRACT

A system comprising an internal device management system configured to interface with an internal device through an application operating on the internal device, and to receive data from the internal device. An interface to an external device management system configured to interface with an external device and to receive data from the external device. The internal device management system is configured to interact with the external device management system via the interface to receive the data from the external device and to generate one or more reports that include the data from the internal device and the data from the external device.

18 Claims, 2 Drawing Sheets

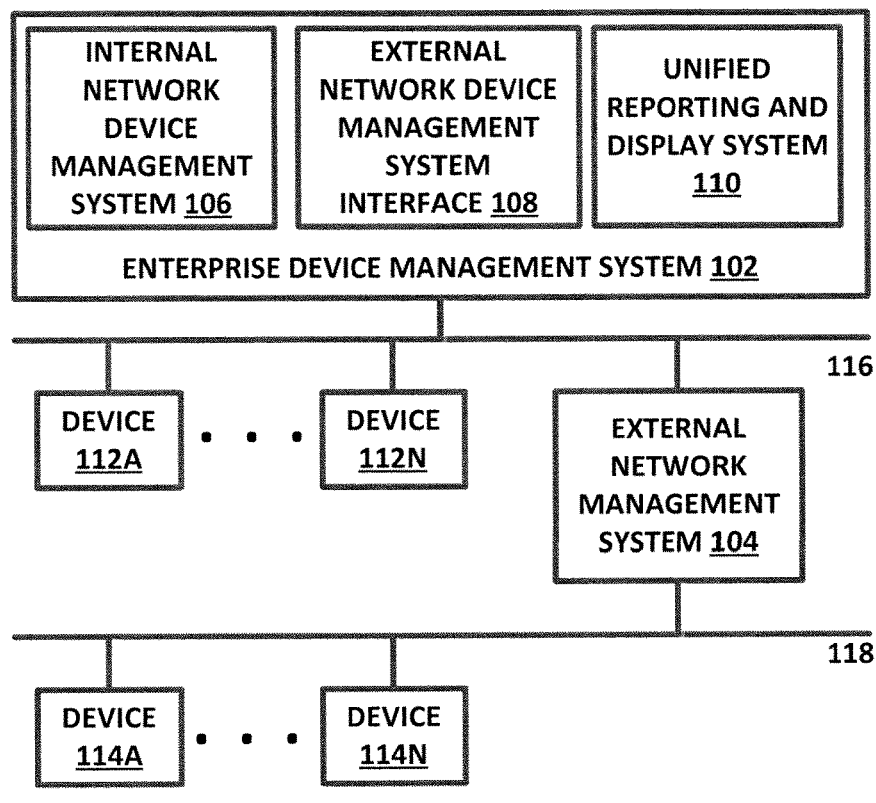
FIGURE 1    100
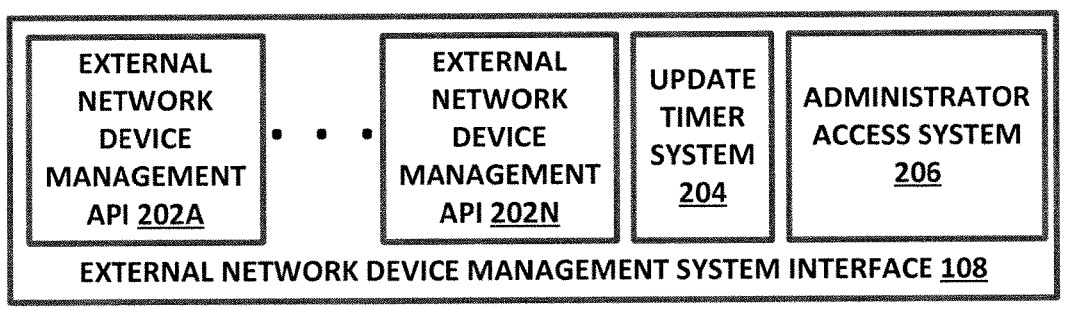
FIGURE 2    200
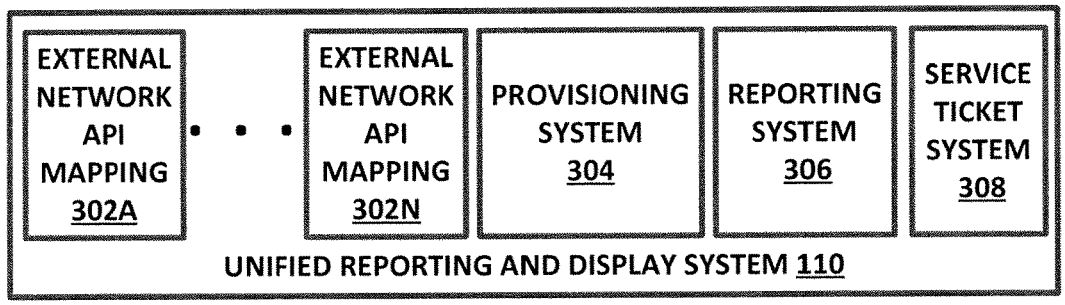
FIGURE 3    300

DEVICE ASSET TRACKING AND SERVICE DESK USING A MANAGEMENT SYSTEM AS A DATA SOURCE

CROSS-REFERENCE TO RELATED APPLICATION

This application is a continuation of U.S. patent application Ser. No. 14/705,878, filed May 6, 2015, titled DEVICE ASSET TRACKING AND SERVICE DESK USING AN EXTERNAL NETWORK MANAGEMENT SYSTEM AS A DATA SOURCE, the entirety of which is incorporated by reference.

TECHNICAL FIELD

The present disclosure relates generally to device management systems, and more specifically to a device asset tracking and service desk using an external network management system as a data source.

BACKGROUND

Large organizations need to track and manage devices used by employees, such as cellular telephones and personal computers. Tracking and management is performed using an application that is installed on the device that reports to a centralized tracking and managing system.

SUMMARY

A system for managing devices associated with an enterprise is disclosed that includes an internal network device management system configured to interface with a plurality of internal network devices through an application operating on each internal network device that is associated with the internal network device management system, to receive data from each of the internal network devices. An external network device management system is configured to interface with a plurality of external network devices through an application operating on each external network device that is associated with the external network device management system, to receive data from each of the external network devices. The internal network device management system is configured to interface with the external network device management system, to receive the data from each of the plurality of external network devices and to generate one or more reports that include the data from the internal network devices and the data from the external network devices.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which:

FIG. 1 is a diagram of a system for tracking and managing devices that uses an external network management system for a subset of devices, in accordance with an exemplary embodiment of the present disclosure;

FIG. 2 is a diagram of a system for providing an external network management system interface, in accordance with an exemplary embodiment of the present disclosure;

FIG. 3 is a diagram of a system for providing unified reporting and display, in accordance with an exemplary embodiment of the present disclosure.

DETAILED DESCRIPTION

Figure 4:
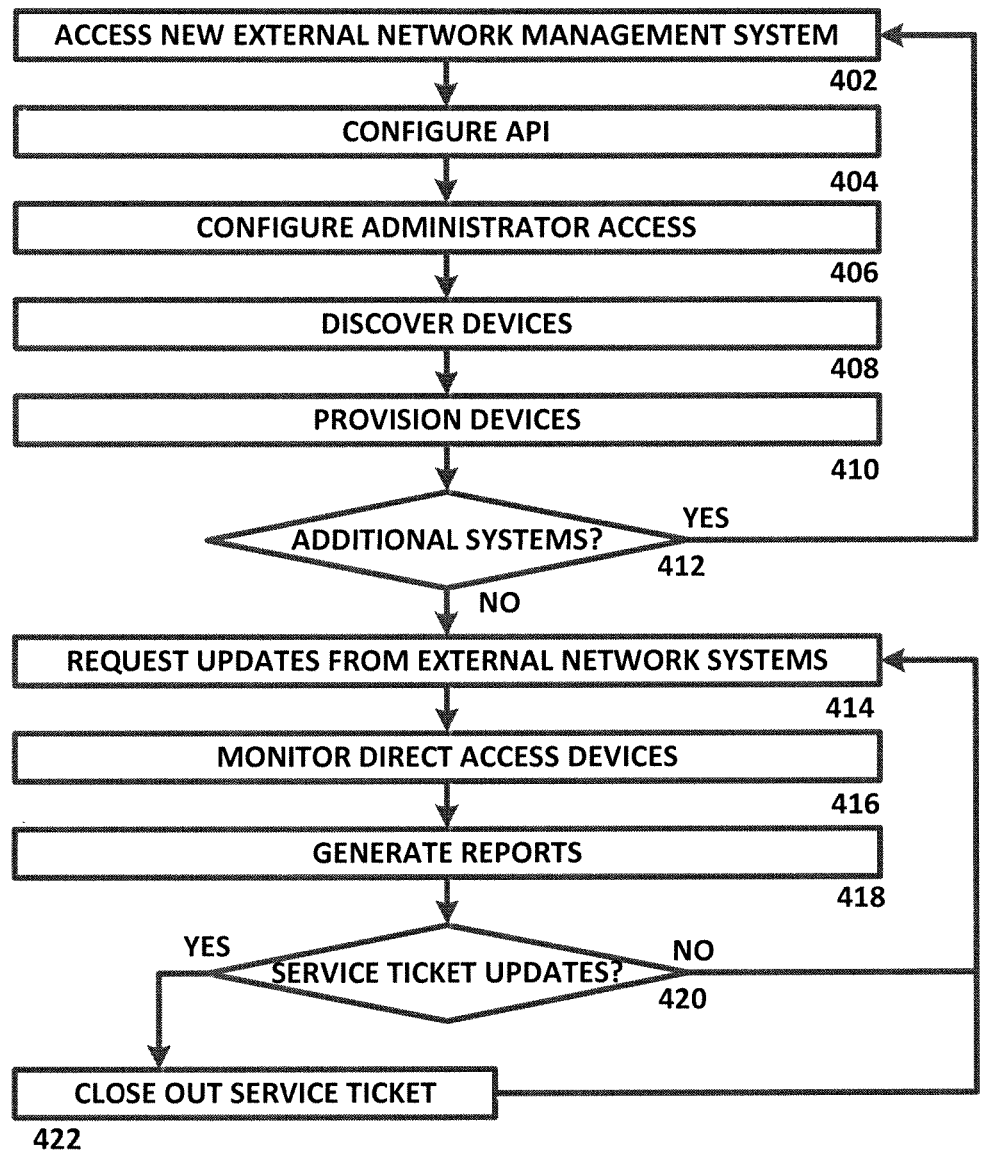
FIG. 4 is a diagram of an algorithm for provisioning and managing clients through an external network management system, in accordance with an exemplary embodiment of the present disclosure.

In the description that follows, like parts are marked throughout the specification and drawings with the same reference numerals. The drawing figures might not be to scale and certain components can be shown in generalized or schematic form and identified by commercial designations in the interest of clarity and conciseness.

Networks generally refer to systems and components that operate in a coordinated manner. For example, a computer network generally refers to work stations, servers, printers, routers and network communications cables that are configured to directly communicate and interoperate, whereas systems and components that are external to the network can generally only interact with any of the internal network systems and components either through a network gateway or through a separate connection to each separate device.

Because of this structure, a network can manage or control systems and components that are internal to the network, but might have limited or no management of control of systems and components that are external to the network. For example, a device on an external network might be able to access the internal network through a portal, but a device management system that controls the configuration of devices that are directly connected to the internal network might be unable to control the configuration of the external device.

However, such systems and components that are connected to external networks might be managed by a device management system on the external network. The external network device management system can further include an applications programming interface that can be used to interact with the external network device management system, so as to allow the internal network device management system to interface with the external network device management system, so as to obtain configuration data for the external network devices, to manage the external network device configuration and to perform other suitable functions. In order to accomplish this, the internal network device management system can be configured to interface with the external network device management system, to query the external network device management system, to track devices that are managed by the external network device management system and to correlate the devices on the external network with devices on the internal network. In this manner, the external network devices are functionally different from the internal network devices, and the internal network device management system is functionally different from the external device management system.

FIG. 1 is a diagram of a system 100 for tracking and managing devices that uses an external network device management system for a subset of devices, in accordance with an exemplary embodiment of the present disclosure. System 100 includes enterprise device management system 102, internal network device management system 106, external network device management system interface 108, unified reporting and display system 110, external network device management system 104, devices 112A through 112N, devices 114A through 114N and networks 116 and 118, each of which can be implemented in hardware or in a suitable combination of hardware and software.

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes a microcomputer or other suitable controller, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections.

Enterprise device management system 102 provides a single, unified system for provisioning, managing and tracking devices for an enterprise. In one exemplary embodiment, an enterprise can have hundreds or thousands of employees, and each employee can have one more associated devices, where the enterprise needs to ensure that the devices are properly configured to interface with the computer services provided by the enterprise, that the devices are operating properly, that the devices are being used by authorized personnel, and to otherwise provision, manage and track the devices. Enterprise device management system 102 can implement these functions and others using an application that is installed on each device, where the application is used to provide additional functional features at the device that are used to facilitate interaction between each device and enterprise device management system 102. In addition, enterprise device management system 102 can interface with devices that are unable to be directly accessed for installation and control of an application, such as a device that uses the Google Chromebook operating system or other operating systems that prevent third party management applications from operating properly on a device. Enterprise device management system 102 can provision, manage and track devices for an enterprise through external network device management systems by using external network device management system interface 108 and unified reporting and display system 110, as discussed further herein, to combine external network management system functionality with functions performed by enterprise device management system 102 for managing devices on an internal network. In this manner, provisioning, reporting, service ticket management and other suitable functions can be managed through a single system, to provide enterprise-wide functionality.

Internal network device management system 106 provides provisioning, reporting, service ticket management and other suitable functions for devices that have an associated application installed that allows internal network device management system 106 to directly access the device. In one exemplary embodiment, internal network device management system 106 can include the Dell KJCE™. System and associate devices, which can include the KACE™ K1000 Systems Management Appliance or other suitable systems.

External network device management system interface 108 provides interface capability to one or more external network device management systems, such as the Google Chromebook device management systems. In one exemplary embodiment, external network device management systems can provide independent device management functionality, but utilization of such functionality would require two or more separate management processes for provisional, reporting, service ticket management and other enterprise device management functions. External network device management system interface 108 allows enterprise device management system 102 to interface with such external network device management systems, as discussed further herein.

Unified reporting and display system 110 assembles provisioning, reporting, service ticket management and other enterprise device management functions into a unified reporting and display system, to allow a system administrator to readily see trends, generate reports, determine whether devices are being serviced and to perform other functions across multiple device management systems. As discussed further herein, devices that are managed by different device management systems can have different types of managed data and managed data functions, and unified reporting and display system 110 allows the different managed data and managed data functions to be mapped to a single set of reporting metrics and interfaces.

External network device management system 104 can perform device provisioning, reporting, service ticket management and other enterprise device management functions, and can provide data on devices to enterprise device management system 102 through an application program interface (API) or in other suitable manners. In one exemplary embodiment, external network device management system 104 can provide information in response to queries through the API, such as a device identifier, a device status, a device model, a mobile enterprise identifier, an operating system version, an operating system build, a platform version, a firmware version, a device enrollment time, a device synchronization time, an annotated location or other notes, an order number, a support end date, an auto-renewal status, a boot mode or other suitable data or functions.

Devices 112A through 112N can include cellular telephones, desktop computers, laptop computers, tablet computers, set top boxes, residential gateways, Internet of Things (IOT) devices, servers or other suitable devices that have an associated application installed for use with internal network device management system 106, such as the KACE™ K1000 Systems Management Appliance or other suitable systems. Devices 112A through 112N are thus able to be directly provisioned, tracked, managed for service requests or otherwise directly accessed.

Devices 114A through 114N can include cellular telephones, desktop computers, laptop computers, tablet computers, set top boxes, residential gateways, IOT devices, servers or other suitable devices that do not have an associated application installed for use with internal network device management system 106, and which are instead managed by an external network management system, such as Chromebook. Devices 114A through 114N are thus unable to be directly provisioned, tracked, managed for service requests or otherwise directly accessed by an internal network device management system for an enterprise, but device data and management functionality can be provided by external network systems.

Networks 116 and 118 can be wireless networks, wireline networks, optical networks, other suitable networks or a suitable combination of such networks. In one exemplary embodiment, portions of networks 116 and 118 can be the same infrastructure equipment, such as the Internet, and portions of networks 116 and 118 can be distinct, such as separate wireless networks, separate local area networks, separate wide area networks and so forth.

In operation, an enterprise can use system 100 to provision, track, provide service to and to otherwise manage hundreds or thousands of discrete devices. System 100 allows the enterprise to utilize third party systems that do not provide a complete set of directly-translatable data and functionality for devices that are managed by the third party system, by interfacing with the third party systems to obtain data and by assembling the data into a single system for provisioning, tracking, generating service tickets, generating reports or performing other functions.

FIG. 2 is a diagram of a system 200 for providing an external network management system interface, in accordance with an exemplary embodiment of the present disclosure. System 200 includes external network management API 202A through 202N, update timer system 204 and administrator access system 206, each of which can be implemented in hardware or a suitable combination of hardware and software.

External network management API 202A through 202N are application program interfaces to external network management systems, such as the Google Chromebook API or other suitable systems or data structures for accessing external network systems. In one exemplary embodiment, an API can include a number of associated data fields having associated field sizes, field identifiers, field delimiters, extensible mark-up language data type definitions, or other suitable data that is used to define how to interface with the external network management system, including messaging protocols, file structures or other suitable data. Each external network management system can include one or more different APIs or other associated data structures, which can be used to interface with the external network management system, to request data from the external network management system, to request functions to be performed on devices that are managed through the external network management system or to perform other suitable functions.

Update timer system 204 performs update timing for updates from the external network management systems. In one exemplary embodiment, the updates can be timed as a function of an allowable number of updates that can be obtained from the external network management system over a period of time, an allowable number of updates that can be obtained for a device over a period of time, a user-selected update period or in other suitable manners.

Administrator access system 206 allows an administrator to configure access parameters to external network management systems, such as user identifiers, passwords, security credentials or other suitable data. In one exemplary embodiment, a user can access external network management systems in a manner that allows the access to be automated, so as to avoid the need for a user to obtain access every time access is required.

In operation, system 200 allows data to be obtained from external network management systems for use in a unified reporting and management environment. System 200 thus allows data and functionality from different management systems to be combined into a single environment for provisioning, reporting, service tracking and other functions.

FIG. 3 is a diagram of a system 300 for providing unified reporting and display, in accordance with an exemplary embodiment of the present disclosure. System 300 includes external network API mapping 302A through 302N, provisioning system 304, reporting system 306 and service ticket system 308, each of which can be implemented in hardware or a suitable combination of hardware and software.

External network API mapping 302A through 302N provide mapping for data obtained from an external network management system to data or fields associated with an internal network management system. In one exemplary embodiment, the data field descriptions, definitions or other suitable configurations for an external network device management system might not correlate directly to an internal network device management system, such that the individual fields need to be separately mapped, supplemented or otherwise modified. External network API mapping 302A through 302N allow the configuration for mapping each field from an external network device management system to be saved and used for processing subsequent data updates, requests and other processes.

Provisioning system 304 provides provisioning for a plurality of devices that are managed by an internal network device management system and one or more external network device management systems. In one exemplary embodiment, device operational settings such as file sharing parameters, administrator parameters, port configurations or other suitable settings can be selected, and provisioning system 304 can include field and function specific settings to accommodate one or more external network management systems for each operational setting, either alone or in conjunction with external network API mapping 302A through 302N.

Reporting system 306 provides reporting for a plurality of devices that are managed by an internal network device management system and one or more external network device management systems. In one exemplary embodiment, device operational data such as hardware data (serial number, device ID, status, model, MEID, MAC address), operating system data (OS version, OS build, platform version, firmware version), user data (annotated user, full name) or miscellaneous data (status, last enrollment time, last sync, annotated location, notes, order number, support end date, auto renewal status, boot mode, unit path) can be selected for reporting, and reporting system 306 can generate suitable reports in response to standardized or user-specific settings, either alone or in conjunction with external network API mapping 302A through 302N.

Service ticket system 308 provides service ticket reporting for a plurality of devices that are managed by an internal network device management system and one or more external network device management systems. In one exemplary embodiment, service ticket data such as the time of a request, a problem description, problem identifier codes or other suitable data can be provided, and service ticket system 308 can track the status of service resolution from service ticket initiation to service ticket close out, the types of problems being encountered as a function of a device, the types of problems being encountered as a function of application or other suitable service data, either alone or in conjunction with external network API mapping 302A through 302N.

In operation, system 300 allows devices that are being managed by different device management systems to be accessed for reporting and display within a single unified portal, so as to eliminate the need for a user to generate multiple reports and to try and reconcile incompatible data fields and system functions. In this manner, an enterprise can effectively manage devices, including devices that are not directly compatible with the device management system used by the enterprise.

FIG. 4 is a diagram of an algorithm 400 for provisioning and managing clients through an external network management system, in accordance with an exemplary embodiment of the present disclosure. Algorithm 400 can be implemented in hardware or a suitable combination of hardware and software.

Algorithm 400 begins at 402, where a new external network device management system API or other suitable interface system is accessed. In one exemplary embodiment, data can be obtained that is required for accessing the system, such as a user identifier, a password, a security certificate or other suitable data. Data defining the associated data fields and functions that are available through the new external network device management system API can also or alternatively be defined. The algorithm then proceeds to 404.

At 404, the API is configured, such as by providing any enterprise-specific settings, by providing any device-specific settings for classes of devices, by creating an administrator account or in other suitable manners. Associated data or settings of an external network management API, an administrator access system, an update timer system or other suitable systems can also or alternatively be provided. The algorithm then proceeds to 406.

At 406, administrator access to devices is configured, such as to select data and functionality that the administrator can access through the external network management system. The algorithm then proceeds to 408.

At 408, one or more devices are discovered using the external network management system. In one exemplary embodiment, the devices can be discovered using device identifiers or other suitable data. The algorithm then proceeds to 410.

At 410, the discovered devices are provisioned. In one exemplary embodiment, the devices can be provisioned by setting one or more device parameters, if the external network device management system supports that function. Alternatively, the device settings can be read and a message to the device users can be generated to manually adjust settings if the ability to adjust settings through the external network management system is not supported, or other suitable processes can also or alternatively be used. In addition, the initial device discovery and provisioning steps can be repeated periodically, as needed. For example, the repetition of 408 can be scheduled automatically and can result in new devices available for provisioning at 410, where the availability of new devices would be the reason for repeating this process. The algorithm then proceeds to 412.

At 412, it is determined whether any additional external network systems need to be accessed and configured. If so, then the algorithm returns to 402, otherwise the algorithm proceeds to 414 where updates are requested from the external network device management systems. In one exemplary embodiment, the updates can be requested for a specific device, for a group of devices, for all devices, for a class of devices or in other suitable manners, such as where the updates are requested periodically for a first period for a first group of devices and for a different second period for a second group of devices or in other suitable manners. The algorithm then proceeds to 416.

At 416, devices that can be directly accessed are monitored, such as by interfacing with an application that operates on each device or in other suitable manners. The algorithm then proceeds to 418.

At 418, one or more reports are generated that combine the data from the devices that are managed using an external network device management system and the data from the devices that are directly managed. In one exemplary embodiment, the reports can compare operating data, service data, error data or other suitable data for devices that are managed in conjunction with an internal network with data for devices that are managed by an external network device management system. The algorithm then proceeds to 420.

At 420, it is determined whether there are any service ticket updates, such as by accessing a service ticket system that tracks requests for service and an associated resolution. The service ticket update data can be determined from the report data, from non-reported device data, from an external network system or from other suitable data. If it is determined that there are no service ticket updates, the algorithm returns to 414, otherwise the algorithm proceeds to 422 where any resolved service tickets are closed out. The algorithm then returns to 414.

In operation, algorithm 400 allows devices that cannot be accessed directly by a device management system, such as by installing an application on the device that can interface with the device management system, to be accessed through a third party device management system, and for the third party device management system data and functionality to be used to provision those devices, to track those devices, to perform service ticket processing for those devices or to perform other suitable functions.

Although algorithm 400 and the associated functions are shown as a single flow chart, other suitable configurations or programming paradigms can also or alternatively be used. For example, a plurality of different algorithms can be used to perform the associated functions, object oriented programming can be used, state diagrams can be used or other suitable systems or processes can be used to implement the algorithmic functions.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

The invention claimed is:
1. A system, comprising:
an internal device management system configured to interface with internal device through an application operating on the internal device that is associated with the internal device management system, to receive data from the internal device;

an interface to an external device management system configured to interact with an external device, the interface being configured to:
    receive a request to access the external device management system;
    select an application programming interface associated with the external device management system; and
    convert the request into a format compatible with the selected application programming interface; and
wherein the internal device management system is configured to:
    interact with the external device management system via the interface;
    receive data from the external device; and
    generate one or more reports that include the data from the internal device and the data from the external device.

2. The system of claim 1 further comprising an enterprise device management system configured to manage coordination between the internal device management system and the external device management system.

3. The system of claim 1 wherein the external device management system interface further comprises an update timer system configured to request update data for each device associated with one of a plurality of external device management systems.

4. The system of claim 1 wherein the external device management system interface further comprises an update timer system configured to request update data for each device associated with a first external device management system prior to requesting update data for each device associated with a second external device management system.

5. The system of claim 2 wherein the enterprise device management system further comprises a unified reporting and display system configured to assemble reporting data for internal devices and reporting data for external devices and to generate a unified display with the internal device reporting data and the external device reporting data.

6. The system of claim 1 wherein the external device management system interface further comprises an administrator access system configured to receive and store configuration data for administrator access to the external device management system and to utilize the stored configuration data to access the external device management system.

7. The system of claim 5 wherein the unified reporting system further comprises a plurality of external application programming interfaces, and wherein the unified reporting system is configured to select one of the plurality of external application programming interfaces as a function of a selected external device management system.

8. The system of claim 5 wherein the unified reporting system further comprises a reporting system configured to generate a single report for a plurality of internal devices and a plurality of external devices in response to a user selection of one or more of a plurality of device attributes.

9. The system of claim 5 wherein the unified reporting system further comprises a service ticket system configured to track service ticket status from service ticket initiation to service ticket close-out for each of a plurality of internal devices and a plurality of external devices.

10. A method comprising:
    interfacing with an internal devices through an application operating on the internal device that is associated with an internal device management system;
    receiving data from the internal device;
    interfacing with an external through an application operating on the external device that is associated with an external device management system;
    receiving data from the external device;
    generating one or more reports that include the data from the internal device and the data from the external device;
    receiving a request to access one of a plurality of external device management systems from the internal device management system;
    selecting an application programming interface associated with the external device management system; and
    converting the request into a format compatible with the selected application programming interface.

11. The method of claim 10 further comprising transferring data between the internal device management system and the external device management system.

12. The method of claim 10 further comprising requesting update data for each device associated with one of a plurality of external device management systems.

13. The method of claim 10 further comprising requesting update data for each device associated with a first external device management system prior to requesting update data for each device associated with a second external device management system.

14. The method of claim 11 further comprising:
    assembling reporting data for internal devices and reporting data for external devices; and
    generating a unified display with the internal device reporting data and the external device reporting data.

15. The method of claim 10 further comprising: receiving and storing configuration data for administrator access to the external device management system; and utilizing the stored configuration data to access the external device management system.

16. The method of claim 14 further comprising selecting one of a plurality of external application programming interfaces as a function of a selected external device management system.

17. The method of claim 14 further comprising generating a single report for a plurality of internal devices and a plurality of external devices in response to a user selection of one or more of a plurality of device attributes.

18. A non-transitory computer-readable medium comprising computer-executable instructions that, when executed by a processor, cause a system to perform operations comprising:
    interface with an internal device through an application operating on the internal device that is associated with an internal device management system;
    receive data from the of the internal device;
    interface with an external device through an application operating on the external device;
    receive data from the external device;
    generate one or more reports that include the data from the internal device and the data from the external device;
    receive a request to access an external device management system;
    select an application programming interface associated with the external device management system; and
    convert the request into a format compatible with the selected application programming interface.

* * * * *